United States Patent [19]

Tsusue et al.

[11] Patent Number: 4,792,862

[45] Date of Patent: Dec. 20, 1988

[54] APPARATUS FOR RECORDING A FREQUENCY MODULATED VIDEO SIGNAL WITH SELECTIVE EMPHASIS OF ITS LOW FREQUENCY COMPONENTS

[75] Inventors: Yoichi Tsusue, Tokyo; Koichi Goto, Kanagawa, both of Japan

[73] Assignee: Sony Corporation, Tokyo, Japan

[21] Appl. No.: 930,423

[22] Filed: Nov. 14, 1986

[30] Foreign Application Priority Data

Dec. 5, 1985 [JP] Japan .................................. 60-274178

[51] Int. Cl.$^4$ ............................................. H04N 5/782
[52] U.S. Cl. ..................................... 358/330; 358/343; 360/19.1
[58] Field of Search ............................. 360/33.1, 19.1; 358/310, 315, 328, 330, 335, 340, 341, 343

[56] References Cited

U.S. PATENT DOCUMENTS 4,613,912  9/1986  Shibata et al. .................. 358/341 X Primary Examiner—Robert L. Richardson
Attorney, Agent, or Firm—Alvin Sinderbrand

[57] ABSTRACT

In an apparatus for recording a video signal on a record medium and having a circuit for separating luminance and chrominance signal components from an input video signal, a frequency-modulator receiving the separated luminance signal component and providing a frequency-modulated luminance signal, and an emphasizer low frequency components of the frequency-modulated luminance signal; a circuit is provided for selecting, as the luminance signal to be recorded on the record medium, either the frequency-modulated luminance signal from the frequency modulator when the video signal is derived from a television tuner or video reproducing apparatus having a relatively large frequency band, or the low frequency emphasized output of the equalizer when the video signal is from a television camera having a relatively smaller frequency band.

10 Claims, 4 Drawing Sheets

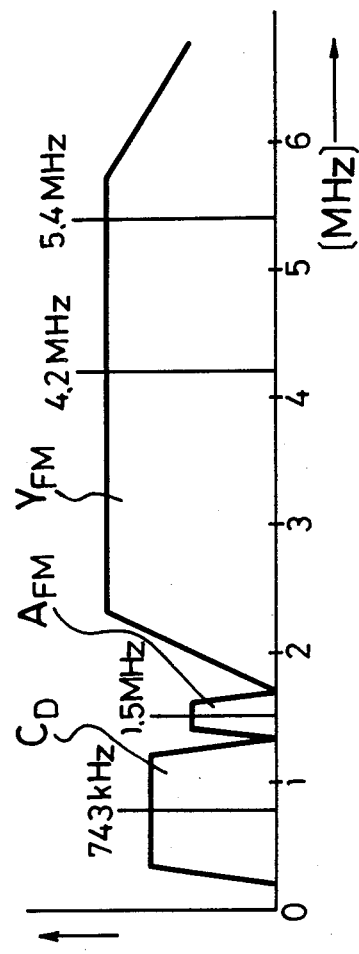
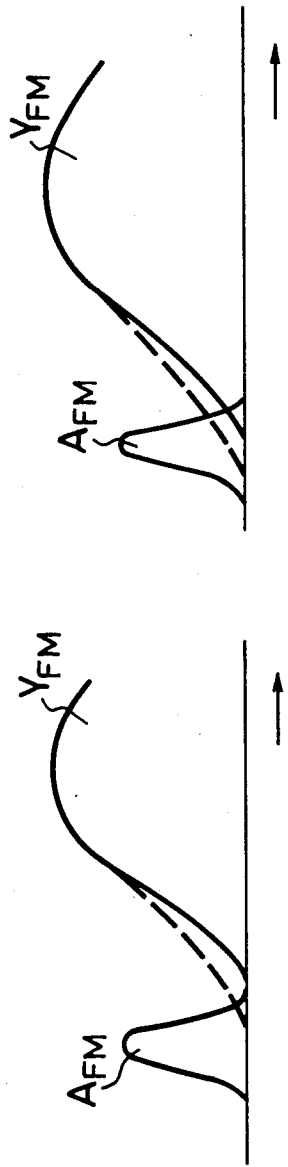

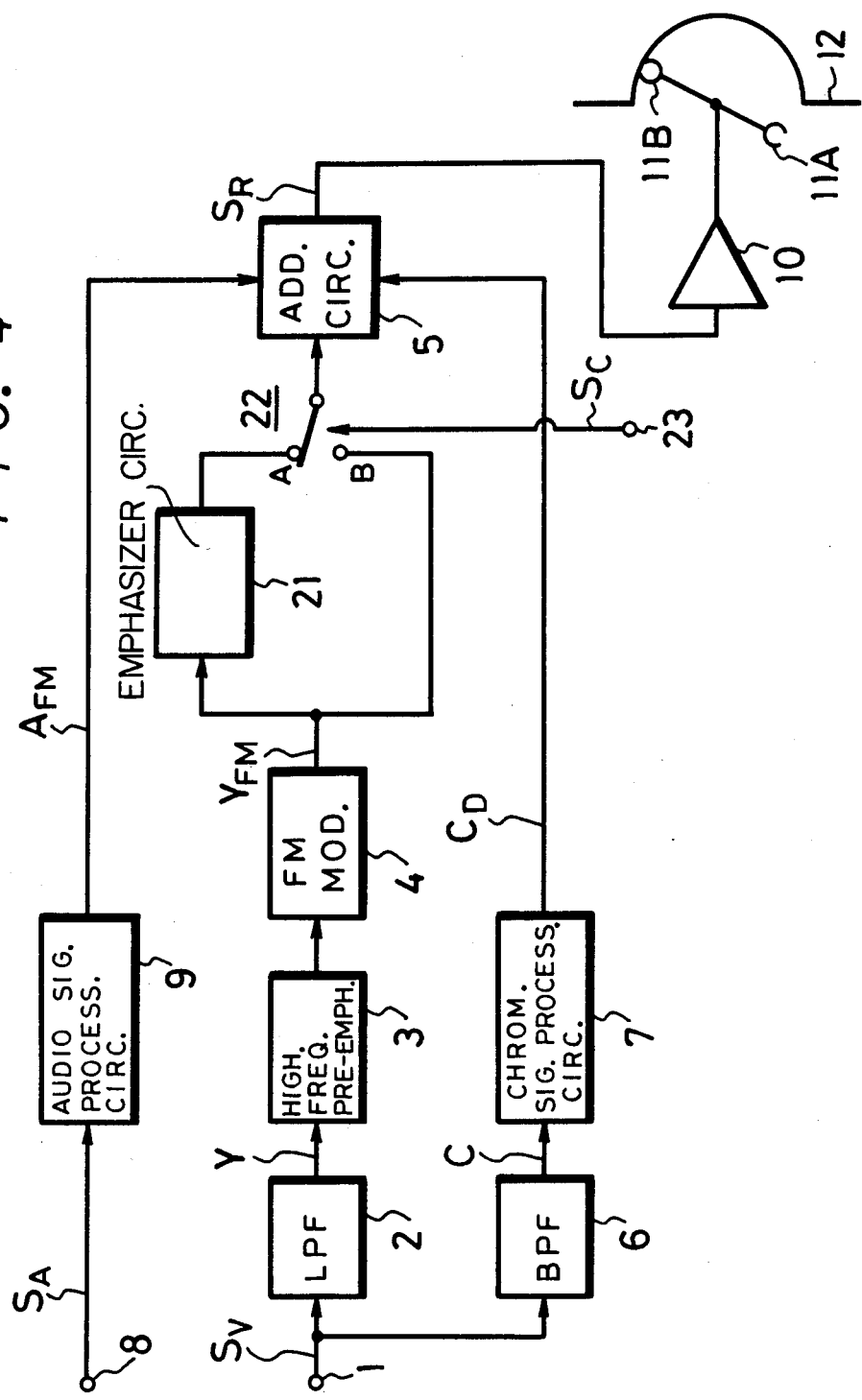

APPARATUS FOR RECORDING A FREQUENCY MODULATED VIDEO SIGNAL WITH SELECTIVE EMPHASIS OF ITS LOW FREQUENCY COMPONENTS

BACKGROUND OF THE INVENTION

1. Field of the Invention

This invention relates generally to an apparatus in which an input video signal is frequency-modulated (FM-modulated) and recorded on a record medium, and more particularly is directed to a video signal recording apparatus which records the video signal and a related audio signal in the same tracks on a record medium.

2. Description of the Prior Art

A recording system of a prior art video tape recorder (VTR) will now be described with reference to FIG. 1 in which a video signal $S_V$ is shown to be applied to an input terminal 1. This video signal $S_V$ is supplied to a low pass filter 2 which separates a luminance signal component Y from the video signal $S_V$. This luminance signal component Y is emphasized, in its high frequency band, by a pre-emphasis circuit 3 and then fed to a frequency-modulating circuit 4, in which it is frequency-modulated such that, for example, the white peak level becomes 5.4 MHz and the sync. chip level becomes 4.2 MHz. A frequency-modulated luminance signal $Y_{FM}$ from frequency-modulating circuit 4 is supplied to an adding or composing circuit 5.

The video signal $S_V$ applied to the terminal 1 is also supplied to a band pass filter 6 which separates a chrominance signal component C from the video signal. The chrominance signal component C is supplied to a chrominance signal processing circuit 7 in which the chrominance signal component C is frequency-converted and subjected to other signal processing to provide a low frequency converted chrominance signal $C_D$ whose color sub-carrier frequency is, for example, converted to 743 kHz. This low frequency converted chrominance signal $C_D$ is also supplied to composing circuit 5.

Further, an audio signal $S_A$ applied to a terminal 8 is supplied therefrom to an audio signal processing circuit 9. The audio signal processing circuit 9 effects signal processing, such as, frequency-modulation, of the audio signal $S_A$ and generates a frequency-modulated audio signal $A_{FM}$ whose carrier frequency is converted to, for example, 1.5 MHz. This frequency-modulated audio signal $A_{FM}$ is also supplied to composing circuit 5.

From composing circuit 5, there is derived a composite signal $S_R$ having the frequency spectrum shown in FIG. 2 and which is composed of frequency-modulated luminance signal $Y_{FM}$, low frequency converted chrominance signal $C_D$ and frequency-modulated audio signal $A_{FM}$. The composite signal $S_R$ is supplied through a recording amplifier 10 to rotary magnetic heads 11A and 11B which operate alternately to record the composite signal $S_R$ in successive oblique tracks on a magnetic tape 12.

In the above described prior art recording apparatus, if the low frequency components of the frequency-modulated luminance signal $Y_{FM}$ are emphasized, the resolution is increased and hence the picture quality can be improved. However, if the low frequency components of the frequency-modulated luminance signal $Y_{FM}$ are emphasized at all times, for example, as disclosed in Japanese Published Patent Application No. 47-137, there is the danger that this emphasis will exert a bad influence on the adjacent frequency-modulated audio signal $A_{FM}$ and hence the tone quality will be deteriorated. For example, when the video signal $S_V$ is generated by a home video camera and has a relatively narrow frequency band, the relationship between the frequency-modulated luminance signal $Y_{FM}$ and the frequency-modulated audio signal $A_{FM}$ is as shown by a solid line in FIG. 3A. In that case, even if the low frequency component of the frequency-modulated luminance signal $Y_{FM}$ is emphasized, as shown by the broken line in FIG. 3A, the level of the emphasized frequency-modulated luminance signal $Y_{FM}$ in the frequency band of the frequency-modulated audio signal $A_{FM}$ is low so that no trouble results therefrom. However, when the video signal $S_V$ is the output from, for example, a television tuner, a video disc reproducing apparatus or other source of a video signal with a relatively wide frequency band, the relationship between the frequency-modulated luminance signal $Y_{FM}$ and the frequency-modulated audio signal $A_{FM}$ is as shown by a solid line in FIG. 3B. Accordingly, if the low frequency component of the frequency-modulated luminance signal $Y_{FM}$ is emphasized, as shown by a broken line in FIG. 3B, the level of the frequency component of the frequency-modulated luminance signal $Y_{FM}$ in the frequency band of the frequency-modulated audio signal $A_{FM}$ is relatively high, and this exerts a bad influence upon the frequency-modulated audio signal $A_{FM}$ and thus the tone quality is deteriorated.

OBJECTS AND SUMMARY OF THE INVENTION

Accordingly, it is an object of this invention to provide an improved apparatus for recording a video signal on a record medium, and which avoids the above described disadvantages of the prior art.

It is another object of this invention to provide an apparatus for recording a video signal on a record medium in such a way that the resolution can be considerably increased to thereby improve the quality of the picture.

According to an aspect of the present invention, there is provided an apparatus for recording a video signal on a record medium comprising means for separating luminance and chrominance signal components from the video signal, frequency modulating means receiving the separated luminance signal component and providing a frequency-modulated luminance signal, emphasizer means receiving said frequency-modulated luminance signal and emphasizing low frequency components thereof to provide an emphasized frequency-modulated luminance signal, selecting means for selecting, as a luminance signal to be recorded, said frequency-modulated luminance signal from said frequency-modulating means or said emphasized frequency-modulated luminance signal from said emphasizer means, and recording means for recording on said record medium said luminance signal which is selected to be recorded.

Further, it is a feature of this invention that the selecting means is controlled so as to select the emphasized frequency-modulated luminance signal from said emphasizer means when said video signal is supplied from a television camera having a relatively narrow frequency band, and to select said frequency-modulated luminance signal from said frequency-modulating means when said video signal has a relatively wide frequency band, for example, is supplied from a television tuner or a video signal reproducing apparatus.

The above, and other objects, features and advantages of the present invention, will become apparent from the following detailed description of a preferred embodiment which is to be read in conjunction with the accompanying drawings, throughout which like reference numerals designate the same elements and parts.

BRIEF DESCRIPTION OF THE DRAWINGS

FIG. 2 is a diagram showing the frequency spectrum of a composite signal which is recorded in the prior art video tape recorder shown in FIG. 1;

FIGS. 3A and 3B are schematic diagrams to which reference is made in explaining the problem overcome by the present invention;

FIG. 4 is a block diagram showing an apparatus for recording a video signal on a record medium according to an embodiment of the present invention.

DESCRIPTION OF THE PREFERRED EMBODIMENT

Figure 1:
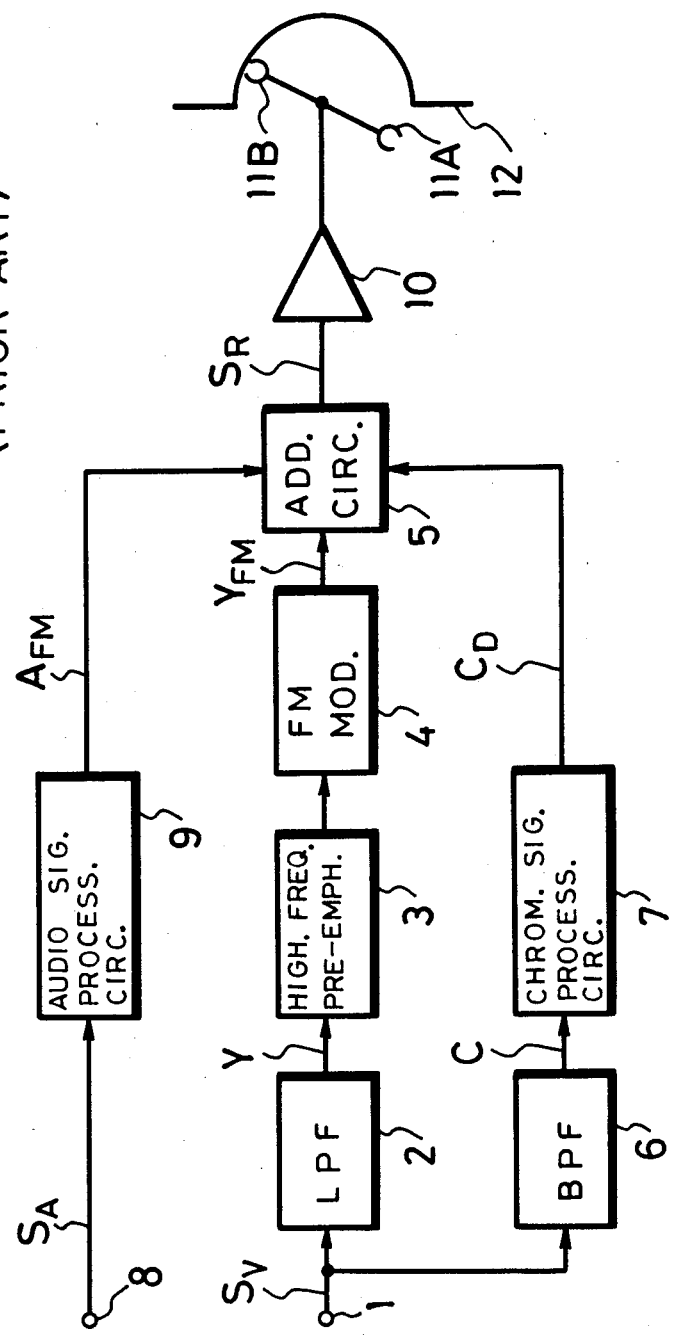
FIG. 1 is a block diagram showing a recording system of a prior art video tape recorder.

Referring in detail to FIG. 4, in which parts corresponding to those described above with reference to FIG. 1 are identified by the same reference numerals, it will be seen that, in accordance with the present invention, the frequency-modulated luminance signal $Y_{FM}$ from frequency-modulator circuit 4 is supplied through an emphasizer circuit 21 to a fixed contact A of a switching circuit 22. The emphasizer circuit 21 is adapted to emphasize the low frequency components of frequency-modulated luminance signal $Y_{FM}$. Further, the frequency-modulated luminance signal $Y_{FM}$ from frequency-modulator circuit 4 is supplied directly to a fixed contact B of switching circuit 22. The output of switching circuit 22 is supplied to composing circuit 5 as the luminance signal to be recorded. The other circuit components in FIG. 4 are similar to those described with reference to FIG. 1.

A switching control signal $S_C$ from a terminal 23 is supplied to switching circuit 22 for controlling the latter. The level of control signal $S_C$ is high or "1" in a television camera recording mode, that is, when the video signal $S_V$ applied to terminal 1 has a relatively narrow frequency band, for example, is derived from a home video camera, and the level of signal $S_C$ is low or "0" in a so-called "line recording" mode, that is, when the video signal $S_V$ has a relatively wide frequency band, for example, is supplied from a television tuner, a video disc reproducing apparatus or the like. The movable contact of switching circuit 22 is engaged with fixed contact A in the television camera recording mode in which the level of signal $S_C$ is high or "1" and the movable contact is engaged with the fixed contact B in the line recording mode in which the level of signal $S_C$ is low or "0".

In the television camera recording mode of the above-described embodiment of the invention, the video signal $S_V$ applied to terminal 1 has a relatively narrow frequency band, for example, as when signal $S_V$ is generated by a home video camera, and the signal $S_C$ supplied from terminal 23 to switching circuit 22 is at a high level or "1" so that the movable contact of switching circuit 22 engages fixed contact A. Therefore, emphasizer circuit 21 is connected between frequency-modulator circuit 4 and adding or composing circuit 5. Accordingly, the low frequency component of the frequency-modulated luminance signal $Y_{FM}$ is emphasized, as indicated by the broken line in FIG. 3A, to thereby increase the resolution and improve the quality of the picture.

On the other hand, in the "line recording" mode in which the video signal $S_V$ applied to terminal 1 has a relatively wide frequency band and is derived from, for example, a television tuner, video disc reproducing apparatus or the like, the signal $S_C$ supplied to switching circuit 22 from terminal 23 is of low level or "0" so that the movable contact of switching circuit 22 engages the fixed contact B. Thus, the frequency-modulated luminance signal $Y_{FM}$ is passed directly from frequency-modulator 4 through switching circuit 22 to composing circuit 5 without emphasis in emphasizer circuit 21. Accordingly, the low frequency component of the FM-modulated luminance signal $Y_{FM}$ is not emphasized to avoid exerting a bad influence on the frequency-modulated audio signal $A_{FM}$. Thus, deterioration of the tone quality can be avoided.

Figure 5:
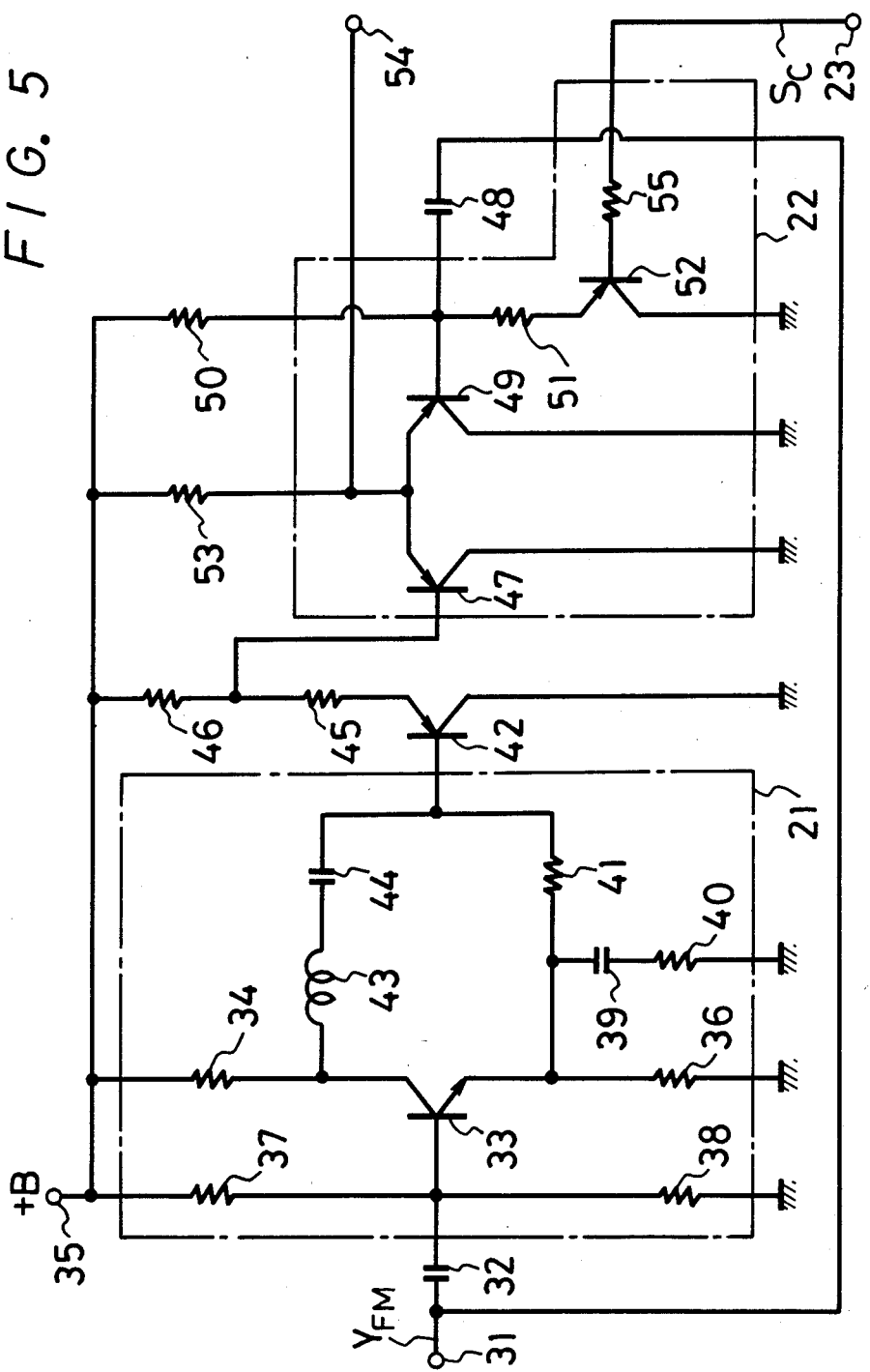
FIG. 5 is a wiring diagram showing details of a circuit that may form a main portion of the apparatus of FIG. 4 according to the present invention.

A practical circuit arrangement for emphasizer circuit 21 and switching circuit 22 in the embodiment of FIG. 4 is shown on FIG. 5 in which the frequency-modulated luminance signal $Y_{FM}$ from frequency-modulator circuit 4 is supplied to a terminal 31. This frequency-modulated luminance signal $Y_{FM}$ is supplied through a capacitor 32 to the base of an npn-transistor 33 which constitutes the emphasizer circuit 21. The collector of transistor 33 is connected through a resistor 34 to a power source terminal 35 to which a positive DC voltage +B is applied, and the emitter of transistor 33 is grounded through a resistor 36. Between power source terminal 35 and the ground, there is connected a series circuit of resistors 37 and 38. A voltage obtained at the junction point between resistors 37 and 38 is applied to the base of transistor 33 as a DC bias voltage.

The junction point between the emitter of transistor 33 and resistor 36 is grounded through a series circuit of a capacitor 39 and a resistor 40 and is also connected through a resistor 41 to the base of a pnp-transistor 42. The junction point between the collector of transistor 33 and resistor 34 is connected through a series resonance circuit of a winding 43 and a capacitor 44 to the base of transistor 42. Thus, in the circuit arrangement of FIG. 5, the frequency-modulated luminance signal $Y_{FM}$ which has had its low frequency component emphasized by emphasizer circuit 21 is applied to the base of transistor 42.

The collector of transistor 42 is grounded and the emitter of transistor 42 is connected through a series circuit of resistors 45 and 46 to power source terminal 35. The junction point between resistors 45 and 46 is connected to the base of a pnp type transistor 47 which forms the switching circuit 22. The collector of the transistor 47 is grounded.

The frequency-modulated luminance signal $Y_{FM}$ from terminal 31 is also supplied through a capacitor 48 to the base of a pnp-transistor 49 whose collector is grounded. A series circuit of resistor 50,51 and a pnp-transistor 52 is connected between power source terminal 35 and the ground. A voltage obtained at the junction point between resistor 50 and 51 is applied to the base of transistor 49 as a DC bias voltage.

The emitters of the transistor 47 and 49 are connected together to power source terminal 35 through a resistor 53, and to the junction between the emitters of transistors 47 and 49, there is connected a terminal 54 at which there is derived the FM-modulated luminance signal $Y_{FM}$ which is fed to the succeeding adding or composing circuit 5.

Further, the switch control signal $S_C$ is supplied to the base of transistor 52 from terminal 23 through a resistor 55.

With the above described circuit arrangement of FIG. 5, in the video camera recording mode, the level of signal $S_C$ becomes high or is "1" so that transistors 52 and 49 are turned OFF while transistor 47 is turned ON. Accordingly, the frequency-modulated luminance signal $Y_{FM}$ whose low frequency component has been emphasized by emphasizer circuit 21 is delivered through transistor 47 to terminal 54. On the other hand, in the so-called "line recording" mode, signal $S_C$ is low in level or "0" so that transistors 52 and 49 are turned ON while transistor 47 is turned OFF. Accordingly, the frequency-modulated luminance signal $Y_{FM}$ from terminal 31 is delivered through transistor 49 to terminal 54 without emphasis of its low frequency component.

In the above-described embodiment of the invention, in the video camera recording mode, emphasizer circuit 21 is in effect connected at the rear stage of frequency-modulator circuit 5, while, in the line recording mode, emphasizer circuit 21 is, in effect, disconnected from frequency-modulator circuit 4. In short, emphasizer circuit 21 is operative on the output of frequency-modulator circuit 4 only in the case where the frequency band of the video signal $S_V$ is relatively narrow so that the low frequency component of the frequency-modulated luminance signal $Y_{FM}$ can be emphasized without adversely affecting the adjacent frequency signals, such as, the frequency-modulated audio signal $A_{FM}$.

Although, in the above described embodiment, the audio signal $S_A$ is frequency-modulated, frequency-multiplexed with the video signal and then recorded in an oblique track on the magnetic tape, the present invention can be similarly applied to other video signal recording schemes.

According to the present invention, as set forth above, since the low frequency component of the frequency-modulated luminance signal is emphasized or not in accordance with the frequency band of the video signal to be recorded, the resolution can be increased without trouble and, hence, the quality of the picture can be improved.

Having described a single preferred embodiment of the invention with reference to the accompanying drawings, it is to be understood that the invention is not limited to that precise embodiment and that many modifications and variations could be effected therein by one skilled in the art without departing from the spirit or scope of the invention as defined by the appended claims.

What is claimed is:

1. An apparatus for recording on a record medium a video signal which includes luminance and chrominance signal components, and which may have a relatively wide frequency band or a relatively narrow frequency band, said apparatus comprising:
    means for separating said luminance and chrominance signal components form a video signal; frequency modulating means receiving the separated luminance signal component and providing a frequency-modulated luminance signal; emphasizer means receiving said frequency-modulated luminance signal and emphasizing low frequency components thereof to provide an emphasized frequency-modulated luminance signal; selecting means for selecting, as a luminance signal to be recorded, said frequency-modulated luminance signal from said frequency-modulated means when said video signal has said relatively wide frequency band, or said emphasized frequency-modulated luminance signal from said emphasizer means when said video signal has said relatively narrow frequency band; and recording means for recording on said record medium said luminance signal which is selected to be recorded.

2. Apparatus according to claim 1; further comprising frequency-converting means for frequency-converting the separated chrominance signal; and adding means for adding the selected luminance signal from said selecting means to the chrominance signal from said frequency-converting means, said adding means being connected between said selecting means and said recording means.

3. Apparatus according to claim 2; in which said record medium is a magnetic tape.

4. Apparatus according to claim 3; in which said recording means includes a recording amplifier for amplifying an output of said adding means, and a pair of rotary magnetic heads for recording an output signal from said amplifier in an oblique track on said magnetic tape.

5. Apparatus according to claim 4; in which said selecting means includes a switching circuit controlled by a switching signal.

6. Apparatus according to claim 5; in which said switching circuit is controlled so as to select said emphasized frequency-modulated luminance signal from said emphasizer means when said video signal is supplied from a television camera, and to select said frequency-modulated luminance signal from said frequency-modulating means when said video signal is supplied from a television tuner or a video signal reproducing apparatus.

7. Apparatus according to claim 6; further comprising an audio signal processing circuit receiving an audio signal corresponding to said video signal, the output of said audio signal processing circuit being supplied to said adding means.

8. Apparatus according to claim 7; in which said audio signal processing circuit frequency-modulates said audio signal.

9. Apparatus according to claim 8; in which said means for separating said luminance and chrominance signal components includes a low-pass filter for separating said luminance signal and a band pass filter for separating said chrominance signal from said video signal.

10. Apparatus according to claim 9; further comprising pre-emphasis circuit means connected between said low-pass filter and said frequency-modulating means for the separated luminance signal component.

* * * * *